United States Patent
Sharp

(10) Patent No.: US 10,741,981 B2
(45) Date of Patent: Aug. 11, 2020

(54) POWER UNIT BOXES

(71) Applicant: Snap-on Incorporated, Kenosha, WI (US)

(72) Inventor: William T. Sharp, Pleasant Prairie, WI (US)

(73) Assignee: Snap-on Incorporated, Kenosha, WI (US)

( * ) Notice: Subject to any disclaimer, the term of this patent is extended or adjusted under 35 U.S.C. 154(b) by 0 days.

(21) Appl. No.: 15/959,976

(22) Filed: Apr. 23, 2018

(65) Prior Publication Data

US 2018/0323555 A1 Nov. 8, 2018

Related U.S. Application Data

(60) Provisional application No. 62/500,746, filed on May 3, 2017.

(51) Int. Cl.
| | |
|---|---|
| *H01R 24/00* | (2011.01) |
| *H01R 13/73* | (2006.01) |
| *H02G 3/18* | (2006.01) |
| *H01R 25/00* | (2006.01) |
| *H02G 3/08* | (2006.01) |
| *H02G 3/10* | (2006.01) |
| *H01R 13/74* | (2006.01) |
| *H01R 27/02* | (2006.01) |

(52) U.S. Cl.
CPC ............ *H01R 13/73* (2013.01); *H01R 13/74* (2013.01); *H01R 25/006* (2013.01); *H02G 3/081* (2013.01); *H02G 3/10* (2013.01); *H02G 3/18* (2013.01); *H02G 3/185* (2013.01); *H01R 27/02* (2013.01)

(58) Field of Classification Search
CPC .......... H02G 3/18; H02G 3/081; H02G 3/185; H02G 3/10; H01R 25/006; H01R 13/74; H01R 13/73; H01R 13/72; H01R 25/003; H01R 25/005; H01R 9/2408; H01R 13/70
USPC ........................................................ 439/535
See application file for complete search history.

(56) References Cited

U.S. PATENT DOCUMENTS

| | | |
|---|---|---|
| D233,729 S | 11/1974 | De Forrest |
| D279,285 S | 6/1985 | Schwartz |
| 5,195,288 A * | 3/1993 | Penczak ................. H02G 3/185 |
| | | 174/490 |
| D350,939 S | 9/1994 | Rossman et al. |

(Continued)

FOREIGN PATENT DOCUMENTS

| | | |
|---|---|---|
| CN | 201623306 | 11/2010 |
| CN | 204391375 | 6/2015 |

(Continued)

OTHER PUBLICATIONS

Canadian Office Action for Application No. 3,001,363 dated Mar. 18, 2019, 3 pages.

(Continued)

*Primary Examiner* — Jean F Duverne
(74) *Attorney, Agent, or Firm* — Seyfarth Shaw LLP

(57) ABSTRACT

A power unit mounting box is disclosed that is adapted to couple to a working surface. The mounting box includes a first surface having a power outlet disposed thereon, and the first surface is angled with respect to the working surface when the power unit mounting box is coupled to the working surface. This provides for ease of access to the power outlet.

9 Claims, 3 Drawing Sheets

(56) References Cited

U.S. PATENT DOCUMENTS

| | | | |
|---|---|---|---|
| D350,940 S | 9/1994 | Rossman et al. | |
| D366,865 S | 2/1996 | Stringer | |
| 5,848,915 A | 12/1998 | Canizales | |
| D405,416 S | 2/1999 | Byrne | |
| D427,973 S | 7/2000 | Giese | |
| D431,529 S | 10/2000 | Giese | |
| D444,126 S | 6/2001 | Chura et al. | |
| D484,098 S | 12/2003 | Lee | |
| 6,875,051 B2 * | 4/2005 | Pizak | H01R 25/003 439/501 |
| D506,441 S | 6/2005 | Lichtscheidl et al. | |
| 7,004,786 B1 * | 2/2006 | Bloom | H01R 13/72 439/142 |
| 7,140,922 B2 | 11/2006 | Luu et al. | |
| D549,176 S | 8/2007 | Kent et al. | |
| D549,654 S | 8/2007 | Kent et al. | |
| 7,407,392 B2 | 8/2008 | Cooke et al. | |
| D626,070 S | 10/2010 | Byrne | |
| D636,728 S | 4/2011 | Terleski et al. | |
| D637,955 S | 5/2011 | Lee et al. | |
| D642,529 S | 8/2011 | Su et al. | |
| 8,119,910 B1 * | 2/2012 | Golden | H02G 3/185 174/53 |
| D666,556 S | 9/2012 | Byrne | |
| 8,622,756 B2 * | 1/2014 | Smed | H01R 9/2408 439/120 |
| D715,225 S | 10/2014 | Mininger et al. | |
| 9,148,006 B2 | 9/2015 | Byrne et al. | |
| 9,220,342 B2 | 12/2015 | Byrne et al. | |
| 9,337,920 B2 | 5/2016 | Chen et al. | |
| D759,596 S * | 6/2016 | Byrne | D13/137.2 |
| D763,797 S | 8/2016 | Xu | |
| 9,437,993 B2 | 9/2016 | Stephens | |
| 9,635,773 B1 * | 4/2017 | Marshall | H01R 13/70 |
| 9,960,556 B1 * | 5/2018 | Jansma | H01R 13/6395 |
| 2003/0186582 A1 * | 10/2003 | Laukhuf | H01R 25/006 439/535 |
| 2004/0242060 A1 | 12/2004 | Plzak | |
| 2005/0167138 A1 | 8/2005 | McCarthy | |
| 2011/0282509 A1 | 11/2011 | Yegin et al. | |
| 2011/0287665 A1 | 11/2011 | Chien | |
| 2012/0278640 A1 | 11/2012 | Caglianone | |
| 2013/0316570 A1 | 11/2013 | Mazzullo et al. | |
| 2014/0106610 A1 | 4/2014 | Byrne et al. | |
| 2014/0307439 A1 | 10/2014 | Chien | |
| 2014/0312691 A1 | 10/2014 | Doljack et al. | |
| 2015/0001937 A1 | 1/2015 | Wang | |
| 2015/0155666 A1 | 6/2015 | Rosenblum | |
| 2015/0327676 A1 | 11/2015 | Chang | |
| 2016/0070324 A1 | 3/2016 | Emby et al. | |
| 2017/0025886 A1 | 1/2017 | Rohmer et al. | |

FOREIGN PATENT DOCUMENTS

| | | |
|---|---|---|
| CN | 204858208 | 12/2015 |
| CN | 106602354 | 4/2017 |
| TW | 201620682 | 6/2016 |

OTHER PUBLICATIONS

Taiwan Action for Application No. 107115008 dated Mar. 6, 2019, 6 pages.
Taiwan First Office Action for Application No. 107115008 dated Sep. 13, 2018, 5 pages.
UK Combined Search and Examination Report for Application No. GB1807237.1 dated Oct. 30, 2018, 7 pages.
Australian Examination Report No. 1 for Application No. 2018203051 dated Oct. 15, 2018, 4 pages.
Power Socket Center 3 Power & 4 USB Charging ports (4.0 Amp Total), published on Feb. 21, 2017, shown as date first listed on Amazon [retrieved from internet on Jan. 7, 2019], 6 pages.
Phoenix, elsafe always innovating [retrieved from internet on Jan. 7, 2019], published Feb. 18, 2017 as per Wayback Machine, 2 pages.
Australian Examination Report No. 2 for Application No. 2018203051, dated Oct. 11, 2019, 5 pages.
Taiwan Office Action for Application No. 107115008, dated Oct. 4, 2019, 6 pages.

* cited by examiner

POWER UNIT BOXES

CROSS-REFERENCE TO RELATED APPLICATIONS

This application claims priority to U.S. Provisional Patent Application No. 62/500,746, entitled Power Strip Box, filed May 3, 2017, the contents of which are incorporated by reference herein in their entirety.

TECHNICAL FIELD OF THE INVENTION

The present invention relates generally to power units. More particularly, the present invention relates to power unit mounting boxes that couple to a working surface.

BACKGROUND OF THE INVENTION

Power units and/or power strips are used to provide power to one or more electronic devices, such as tools, tool chargers, computers, and other electrical devices. However, in certain areas, such as work areas, the location and ease of access of the ports on the power unit can be difficult to access.

SUMMARY OF THE INVENTION

The present invention relates to a power unit mounting box adapted to couple to a working surface. The power unit mounting box includes a first surface including an aperture adapted to receive a power outlet. The first surface is angled with respect to the working surface when the power unit mounting box is coupled to the working surface. One or more universal serial bus (USB) ports, and power switch/circuit breaker may also be disposed on the first surface, to provide for ease of access to the power outlet, USB ports, and power switch.

BRIEF DESCRIPTION OF THE DRAWINGS

For the purpose of facilitating an understanding of the subject matter sought to be protected, there are illustrated in the accompanying drawings embodiments thereof, from an inspection of which, when considered in connection with the following description, the subject matter sought to be protected, its construction and operation, and many of its advantages should be readily understood and appreciated.

DETAILED DESCRIPTION

Figure 1:
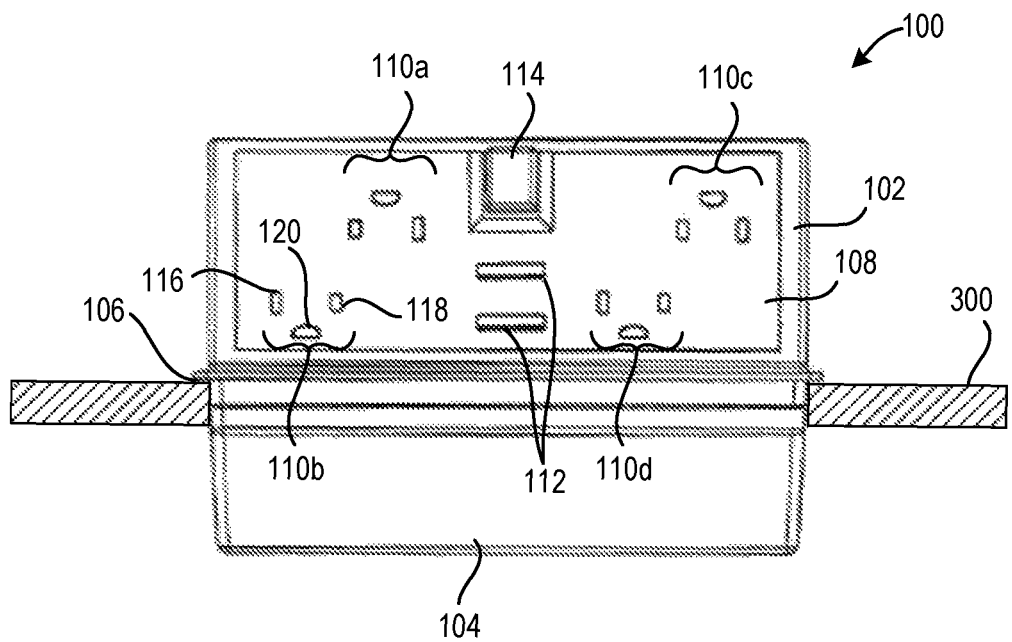
FIG. 1 is a side view of a power unit according to an embodiment of the present invention.

While this invention is susceptible of embodiments in many different forms, there is shown in the drawings, and will herein be described in detail, a preferred embodiment of the invention with the understanding that the present disclosure is to be considered as an exemplification of the principles of the invention and is not intended to limit the broad aspect of the invention to embodiments illustrated. As used herein, the term "present invention" is not intended to limit the scope of the claimed invention and is instead a term used to discuss exemplary embodiments of the invention for explanatory purposes only.

The present application discloses a power unit mounting box that is adapted to couple to a working surface. The mounting box includes a first surface having a power outlet disposed thereon, and the first surface is angled with respect to the working surface when the power unit mounting box is coupled to the working surface. This provides for ease of access to the power outlet.

Figure 2:
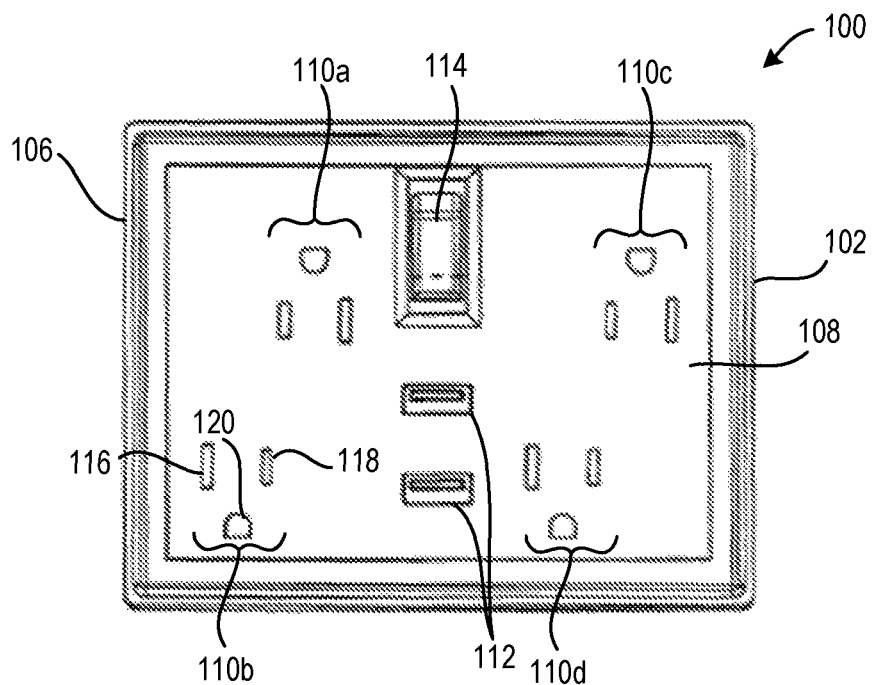
FIG. 2 is a view of an angled surface of the power unit of FIG. 1.
Figure 3:
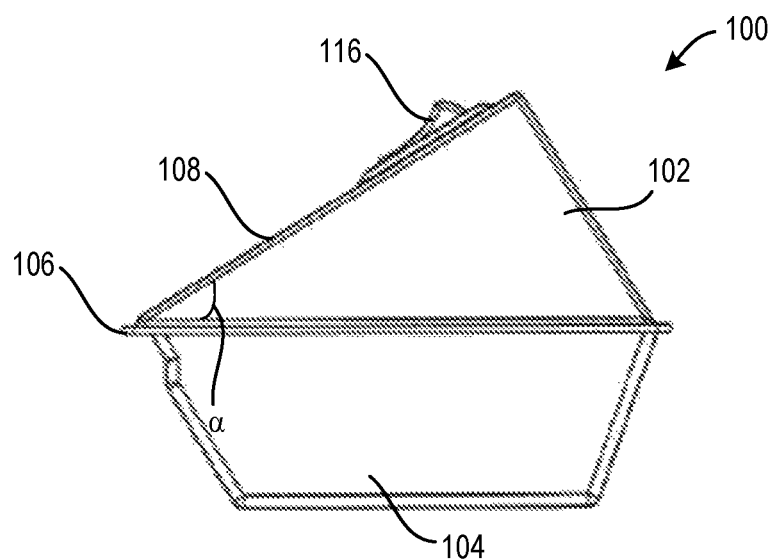
FIG. 3 is another side view of the power unit of FIG. 1.

Referring to FIGS. 1-3, a power unit 100 includes first and second housing portions 102 and 104, respectively. The first housing portion 102 may be coupled to the second housing portion 104, and have a flange 106. The power unit 100 may be installed or disposed in a working surface 300, such as a tool storage cabinet, a tool box, or other working surface. When installed, the first housing portion 102 is disposed or positioned on a first side of the working surface 300, with the flange 106 adjacent the working surface 300, and the second housing portion 104 is disposed or positioned on a second opposite side of the working surface 300.

The first housing portion 102 may have a first surface 108 that is angled with respect to the working surface 300. For example, as illustrated in FIG. 3, the first surface 108 may be disposed at an angle $\alpha$. The angle $\alpha$ may be about 20-60 degrees, about 30-50 degrees, and more particularly, about 45 degrees.

A power strip may be disposed in an aperture in the first surface 108, and form at least a portion of the first surface 108. For example, one or more power outlets 110, universal serial bus (USB) ports 112, and a power switch/circuit breaker 114 may be disposed on or in the first surface 106.

The one or more power outlets 110, universal serial bus (USB) ports 112, and power switch/circuit breaker 114 extend into the first housing portion 102 and are accessible by a user on the first surface 108. As illustrated, four power outlets 110a-110d may be disposed on the first surface 108. However, it should be appreciated that more or less than four power outlets 110 may be included, and the dimensions of the power unit 100 may be modified accordingly.

Each power outlet 110a-110d may include a neutral port 116, a hot port 118 (which is smaller in size compared to the neutral port 116), and a ground port 120. As illustrated, power outlets 110a and 110b are disposed on the first surface 108 proximate to a first end of the first surface 108, and power outlets 110c and 110d are disposed on the first surface 108 proximate to a second end of the first surface 108. The power outlet 110a is also oriented 180 degrees with respect to the power outlet 110b. For example, the ground port 120 of power outlet 110a is proximate a top end of the first surface 108, and the ground port 120 of power outlet 110b is proximate a bottom end of the first surface 108. Further, the power outlets 110a and 110b are staggered with respect to each other. For example, the power outlet 110a is disposed proximate a central portion of the first surface 108, and the power outlet 110b is disposed proximate an end of the first surface 108.

Power outlets 110c and 110d have a similar arrangement with respect to each other. For example, the power outlet 110c is oriented 180 degrees with respect to the power outlet 110d. For example, the ground port 120 of power outlet 110c is proximate the top end of the first surface 108, and the ground port 120 of power outlet 110d is proximate the bottom end of the first surface 108. Further, the power outlets 110c and 110d are staggered with respect to each other. For example, the power outlet 110c is disposed proximate an end of the first surface 108, and the power outlet 110b is disposed proximate a central portion of the first surface 108. However, it should be appreciated that the power outlets 110a-110d may have differing orientations or and/or arrangements.

The USB ports 112 and power switch/circuit breaker 114 may be disposed in or on a central portion of the first surface 108. The power switch/circuit breaker 114 may be disposed above the USB ports 112. For example, the power switch/circuit breaker 114 may be disposed between power outlets 110a and 110c, and the USB ports 112 may be disposed between the power outlets 110b and 110d. As illustrated, there are two USB ports 112 disposed on the first surface 108, and have a length oriented to extend along a length of the first surface 108. However, it should be appreciated that the orientation of the USB ports 112 and power switch/circuit breaker 114 may be altered to suite a particular need.

The second housing portion 104 may include a cavity that is adapted to house wiring and other internal components of the power unit 100. The second housing portion 104 may also include a power inlet port that is adapted to couple to a power source for supplying power to the power outlets 110a-110d, USB ports 112, and power switch/circuit breaker 114. The power inlet port, may also be a corded plug extending from the power unit 100. Power may be provided into the power unit 100 via the power inlet port, and to the power switch/circuit breaker 114. When the power switch/circuit breaker 114 is in an ON position, power is provided to the power outlets 110a-110d and USB ports 112. When the power switch/circuit breaker 114 is in an OFF position, power is prevented from flowing to the power outlets 110a-110d and USB ports 112. The power switch/circuit breaker 114 may also include a circuit breaker adapted to protect the power outlets 110a-110d and USB ports 112, as well as any electrical device plugged into the power outlets 110a-110d and/or USB ports 112 from power surges, etc.

As described above, the power unit 100 may be installed or disposed in a working surface 300, such as a tool storage cabinet, a tool box, or other working surface. When installed, the first housing portion 102 is disposed or positioned on a first side of the working surface 300, with the flange 106 adjacent the working surface 300, and the second housing portion 104 is disposed or positioned on a second opposite side of the working surface 300. The power unit 100 (i.e., the first and/or second housing portions 102, 104) may be coupled to the working surface 300 via fasteners, adhesive, or other known means of coupling the power unit 100 to a working surface 300.

In another embodiment, the power unit may be coupled directly to a working surface without the need of a second housing portion. For example, a power unit box (similar to the first housing portion 102 described above) may be coupled directly to a working surface, and any internal components and/or wiring may be extended through the working surface.

Figure 4:
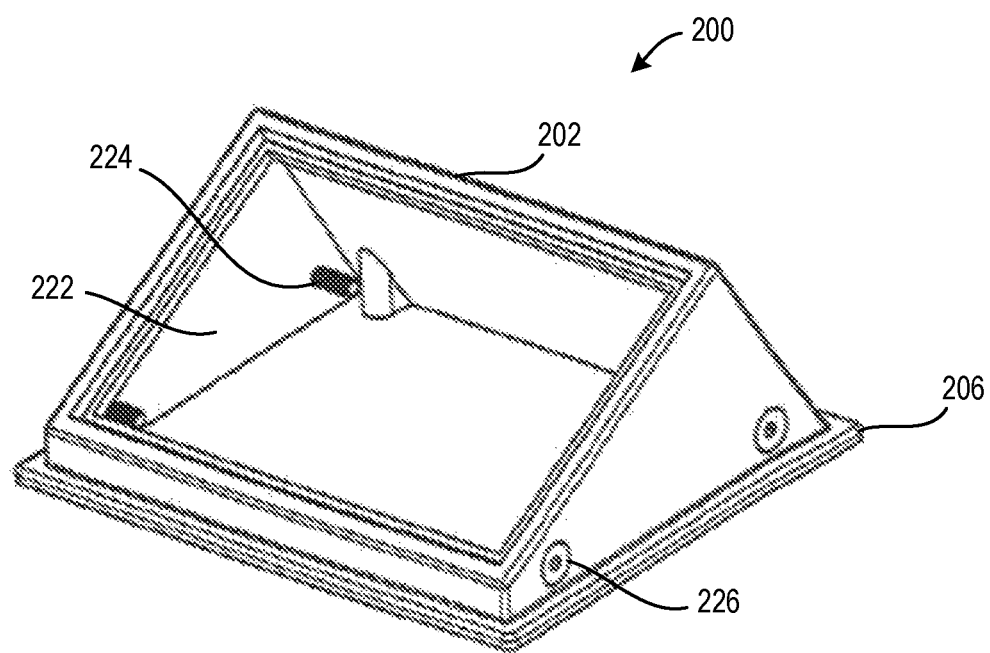
FIG. 4 is a perspective view of a power unit mounting box according to an embodiment of the present invention.
Figure 5:
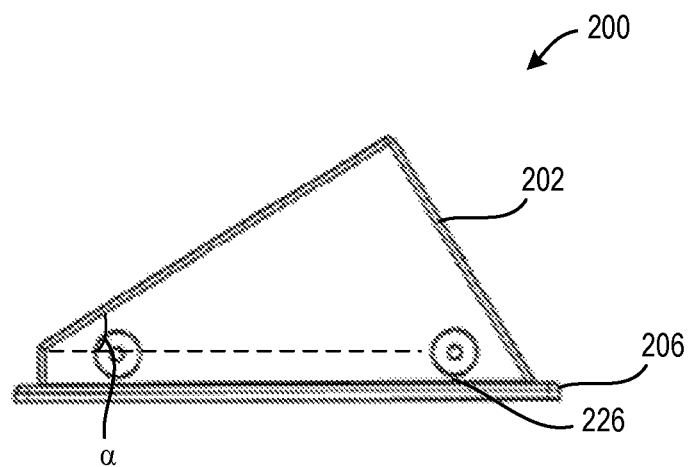
FIG. 5 is a side view of the power unit mounting box of FIG. 4.
Figure 6:
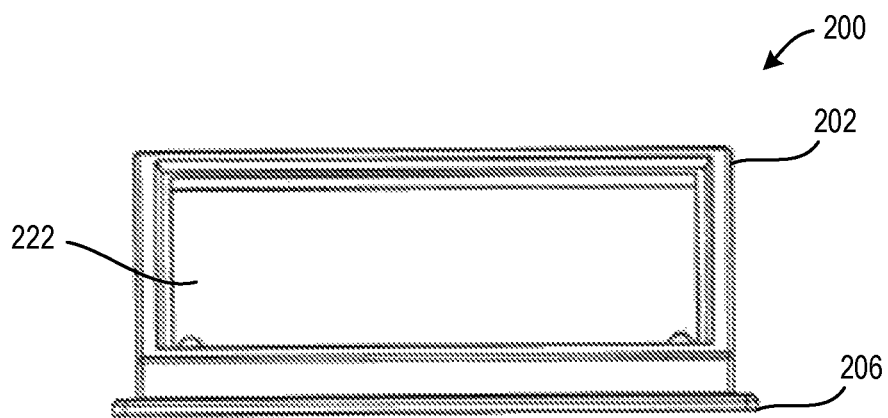
FIG. 6 is another side view of the power unit mounting box of FIG. 4.

Referring to FIGS. 4-6, a power unit mounting unit 200 is disclosed that includes a housing 202 having a flange 206 and a first face 208 (may also be referred to as a first surface 208) that is angled at an angle α with respect to the flange (or working surface onto which the power unit mounting unit 200 is mounted). The angle α may be about 20-60 degrees, about 30-50 degrees, and more particularly, about 45 degrees.

A power strip may be disposed in an aperture 222 in the first surface 208, and form at least a portion of the first surface 208. For example, a power strip having one or more power outlets 110, universal serial bus (USB) ports 112, and a power switch/circuit breaker 114 may be disposed on or in the first surface 208. In this respect, a power inlet port may also be incorporated into the power unit mounting unit 200 that is adapted to couple to a power source for supplying power to the power outlets 110a-110d, USB ports 112, and power switch/circuit breaker 114, as described above.

The power unit mounting unit 200 may also include one or more fastener apertures 224 and fasteners 226. This may allow the power unit mounting unit 200 to be coupled to a mounting bracket or area of a working surface. For example, a working surface may have protrusions that extend away from the working surface. The power unit mounting unit 200 may be disposed over the protrusions, and the fasteners may be inserted through the power unit mounting unit 200 and into the protrusions. Alternatively, the power unit mounting unit 200 may be coupled to the working surface via adhesive, or other known means of coupling the power unit mounting unit 200 to the working surface.

As used herein, the term "coupled" and its functional equivalents are not intended to necessarily be limited to direct, mechanical coupling of two or more components. Instead, the term "coupled" and its functional equivalents are intended to mean any direct or indirect mechanical, electrical, or chemical connection between two or more objects, features, work pieces, and/or environmental matter. "Coupled" is also intended to mean, in some examples, one object being integral with another object. As used herein, the term "a" or "one" may include one or more items unless specifically stated otherwise.

The matter set forth in the foregoing description and accompanying drawings is offered by way of illustration only and not as a limitation. While particular embodiments have been shown and described, it will be apparent to those skilled in the art that changes and modifications may be made without departing from the broader aspects of the inventors' contribution. The actual scope of the protection sought is intended to be defined in the following claims when viewed in their proper perspective based on the prior art.

What is claimed is:

1. A power unit mounting box adapted to couple to a working surface, comprising:
   a first surface including an aperture adapted to receive a power outlet, wherein the first surface is disposed at an angle with respect to the working surface when the power unit mounting box is coupled to the working surface;
   first and second power outlets disposed on the first surface and that are staggered with respect to each other, wherein the first and second power outlets form a first set of power outlets;
   third and fourth power outlets disposed on the first surface and that are staggered with respect to each other, wherein the third and fourth power outlets form a second set of power outlets; and
   a universal serial bus (USB) port disposed on the first surface,
   wherein each of the power outlets and the universal serial bus (USB) are usable when the other of the power outlets and the universal serial bus (USB) are being used.

2. The power unit mounting box of claim 1, wherein the universal serial bus (USB) port is disposed between the first and second sets of power outlets.

3. The power unit mounting box of claim 1, further comprising a power switch disposed on the first surface between the first and second power outlets.

4. The power unit mounting box of claim 3, wherein the power switch includes a circuit breaker.

5. The power unit mounting box of claim 1, wherein the angle is about 20-60 degrees.

6. The power unit mounting box of claim 1, wherein the angle is about 30-50 degrees.

7. The power unit mounting box of claim 1, wherein the angle is about 45 degrees.

8. The power unit mounting box of claim 1, wherein the second power outlet is oriented 180 degrees with respect to the first power outlet, and the fourth power outlet is oriented 180 degrees with respect to the third power outlet.

9. A power unit mounting box adapted to couple to a working surface, comprising:
   a first housing portion including:
      a flange adapted to be disposed adjacent the working surface when the power unit mounting box is coupled to the working surface;
      a first surface including an aperture adapted to receive a power outlet and disposed at an angle with respect to the flange; and
      first and second power outlets disposed on the first surface; and
   a second housing portion adapted to couple to the first housing portion, wherein the first housing portion is adapted to be disposed on a first side of the working surface, and the second housing portion is adapted to be disposed on a second side of the working surface.

* * * * *